United States Patent [19]

Uhlmann et al.

[11] Patent Number: 5,627,768

[45] Date of Patent: May 6, 1997

[54] SIGNAL PROCESSING SYSTEM AND METHOD FOR PERFORMING A NONLINEAR TRANSFORMATION

[75] Inventors: Jeffrey K. Uhlmann; Simon J. Julier, both of Oxford, United Kingdom

[73] Assignee: New Tech Ventures, Company, Jefferson City, Mo.

[21] Appl. No.: 505,762

[22] Filed: Jul. 21, 1995

[30] Foreign Application Priority Data

Aug. 25, 1994 [GB] United Kingdom ................... 9417170

[51] Int. Cl.⁶ .................................................. G06F 17/60
[52] U.S. Cl. ................................... 364/553; 364/581
[58] Field of Search ............................ 364/554, 575, 364/573, 581, 582, 553, 551.01, 468, 578, 579; 395/22

[56] References Cited

U.S. PATENT DOCUMENTS

| | | | |
|---|---|---|---|
| 4,792,231 | 12/1988 | Fried | 364/525 |
| 4,873,655 | 10/1989 | Kondraske | 364/553 |
| 5,115,391 | 5/1992 | Puthenpura et al. | 364/152 |
| 5,144,549 | 9/1992 | Youcef-Toumi | 364/148 |
| 5,303,269 | 4/1994 | Altes | 375/78 |
| 5,530,447 | 6/1996 | Henderson et al. | 342/70 |

OTHER PUBLICATIONS

Novel approach to nonlinear/non–Gaussian Bayesian state estimation, N. J. Gordon et al.; IEE Proceedings–F, vol. 140, No. 2, Apr. 1993.
Tracking and Data Association, Yaakov Bar–Shalom t al.; Academic Press, Inc., vol. 179 in Mathematics in Science and Engineering date unknown.

Primary Examiner—James P. Trammell
Assistant Examiner—Bryan Bui
Attorney, Agent, or Firm—Oblon, Spivak, McClelland, Maier & Neustadt, P.C.

[57] ABSTRACT

A system and a method for estimating the expected value and covariance of a nonlinear function of a random variable includes the steps of measuring the random variable, generating a discrete distribution of a first set of values for the random variable about the measured value for the random variable which have a predetermined covariance, calculating a second set of values by applying the nonlinear function to the first set of values, and determining the mean and the covariance of the nonlinear function of the measured value based upon the second set of values. The system and the method provide a tractable procedure for accurately estimating the mean and the covariance of a nonlinear function of one or more random variables, which has applications in tracking, process control, and system modelling.

16 Claims, 4 Drawing Sheets

SIGNAL PROCESSING SYSTEM AND METHOD FOR PERFORMING A NONLINEAR TRANSFORMATION

BACKGROUND OF THE INVENTION

1. Field of the Invention

This invention relates generally to a signal processing system which is specialized or programmed for (1) receiving a measured signal produced directly or indirectly from a signal that is received from a measuring device (2) to determining a mean and a covariance of a nonlinear transformation of the measured signal and (3) transmitting a resulting signal representing the determined mean and covariance in order to evoke a response related to the measured signal. The response is a physical response from a system receiving the resulting signal. This invention also relates generally to the corresponding signal processing method.

This invention also relates to a signal processing system which is programmed or specialized for estimating the expected value and covariance of a nonlinear function of a measured signal, wherein the nonlinear function is a model of a system which assumes that the measured signal is a measure of at least one of the variables of the modelled system and is a random variable, and for evoking a physical response, and to the corresponding signal processing method.

2. Discussion of the Background

The problems associated with the prior art predictions of nonlinear functions of a random variable will first be illustrated with the description of state functions of random variables and how the time evolution of the state function has been estimated.

A state function is a column vector whose components are the state variables of a system.

A state variable is one of a minimum set of numbers each of which represent the state of the system such that the set of numbers contain enough information about the history of the system to enable computation of the future behavior of the system.

A system is a set of interrelated elements whose time dependent behavior is coupled to one another.

One class of systems are physical systems. An example of a physical system is two bodies, described by their relative positions and velocities, interacting via gravitational or electromagnetic forces.

A second class of systems are engineering systems. An example of an engineering system is a combination of several pieces of equipment that are integrated with one another to perform a specific function. Examples of engineering systems are a radar tracking and/or control system, an automobile ignition system, a machine for monitoring and controlling a chemical reactions, etc.

If there were no random noise present in a system, the state function would completely determine the time evolution of the system. That is, the time evolution of the state variables (i.e., the values of the state variables at a future time), would be predetermined.

For example, the state function for the position of an object undergoing orbital motion about a large gravitational source in according with the deterministic laws of Newtonian mechanics would consist of, as the values for the state variables, the components of the position vector of the object and the velocity of the object. The state variables in this example are determined by the parametric equations of motion for the components of the position vector of the object, which in turn are derived from the Newtonian equations for the forces acting upon the object.

The time evolution of the state function may be thought of as a time transformation function acting upon the state function and which transforms the state variables from their value at a first time to their values at a second time that is subsequent to the first time. The time transformation function is usually a nonlinear function of time.

If there is random noise in the physical system, then the state variables are random variables. In this case, a time transformation function acting on the state function cannot define the time evolution of the state function or its state variables in a deterministic way. Instead, all that can be determined are expected values for the state variables and covariance between the various state variables (i.e., expected values and covariance for the state function).

The method that is most commonly used for estimating the time evolution of a physical system containing random noise is called the extended Kalman filter (EKF). The EKF method assumes, for the purpose of estimating the state function at the time increment k+1 that the estimated mean of the nonlinear state function at time increment k is approximately equal to the actual value of the nonlinear state function at the time increment k.

The state function is modelled by the set of time dependent functions which determine the state variables at a given time. At least one of the functions for the set of state variables includes a random noise term to model the noise. Essentially, the EKF method estimates the value of the state function at the time increment k+1 as a Taylor series expansion of the state function (i.e., expands the set of functions for the state variables as a Taylor series expansions) about the time increment k, and truncates the Taylor series after the first order terms.

However, values provided by the EKF method for the expected values for the state variables and the covariance for the state variables of the state function at time increment k+1 are generally not optimal. That is, given the information available at the time increment k, a more accurate estimate of the expected values and covariance of the state variables is possible. Another way to say this is that the EKF method does not propagate the state vector (i.e., the vector formed by the values of the state variables) and its covariance (i.e., the covariance between the values of the state variables) in time (i.e., predict the expected value and covariance of all the state variables at the subsequent second time based upon measured values of the state variables at the first time), as accurately as the information available at the first time about the state of the system would permit.

Moreover, the EKF method also requires calculation of a Jacobian matrix involving the first order terms, (which include first order derivatives), in the Taylor series. The first order derivatives of the Taylor series may be nonexistent, in which case the EKF method fails. In addition, the equations relating the Jacobian matrix to the covariance of the system can require an unmanageably large number of calculations. Furthermore, it is not generally possible to determine an upper limit to the uncertainties in the expected values of the state variables that are determined by the EKF method. Therefore, the EKF method is unreliable.

One example where state functions are used for tracking of an object, is in radar tracking systems where the trajectory of an object must be determined based upon measurements of its past and present position, in order to calculate its future position based upon a trajectory function of the position and velocity of the object.

Radar tracking systems send out radar signals and receive the reflected radar signals from objects. The radar signal beam moves angularly in time in order to sweep over different angular orientations. The time delay between radar signal transmission and reception is correlated to the distance of the object from the radar system. Azimuthal and/or elevational (i.e., bearing or angular) information is correlated to the time of reception of the reflected signal because of the changing direction of the radar beam. However, there are predetermined uncertainties associated with the time delay measurement and time of reception of the reflected radar signal. Therefore, there is an uncertainty associated with the value determined for the position of the object based upon the radar tracking system measurement. Thus, the determined positions of the object, that are determined by the radar tracking system, correspond to random variables. Therefore, the time transformation function for the object defining the position of the object as a function of time must be modelled as a function of random variables for the determined positions of the object, in order to account for the uncertainty in the determined position of the object.

The EKF or similar methods have been used in order to estimate the future expected position of the object and the covariance in that expected position, based upon the trajectory function modelling the trajectory of the object as a function of the positions and predetermined uncertainties in the positions of the object determined by the radar tracking system. However, this type of estimation of the future position of the object suffers from the drawbacks mentioned hereinabove in the discussion of the EKF method.

The foregoing example of a radar tracking system may also be used to illustrate a more general problem than the time evolution of a state function, which the present invention also addresses. This more general problem is the estimation of the value of a nonlinear function of a random variable of some physically significant quantity.

In the context of the example of the radar tracking system, this more general problem occurs when estimating the position and the uncertainty in the position of the object based upon the radar measurements.

There is a predetermined uncertainty in the time delay for the radar reflection signal received by the radar tracking system. Moreover, there is a predetermined uncertainty in the determination of the angular direction of the radar beam at any given time and, hence, in the determined angular orientation of the object relative to the radar tracking system. This uncertainty in the determined angular orientation occurs at least because the radar beam has an uncertainty in its intensity distribution about its cross-section that is reflected as an uncertainty in the time that the reflected signal is received. Therefore, the measurement of the time delay and the time of reception of the reflected signal are random variables.

The position and angular orientation of the object are nonlinear functions of the measured values for time delay and absolute time of radar signal reception. Since those values must be modelled as random variables to include their uncertainty, the EKF or a similar method has been used in order to determine expected values and covariance for the actual position of the object, since the actual position is a function of the random variables. Thus, the initial determination of the expected position of the object and the uncertainty associated therewith are also subject to the problems associated with the EKF method.

Most generally, a signal representing a measurement of any physical system inherently has some degree of random error associated therewith. Thus, the model of any physical system, if it is to accurately account for that random error, must include a way to estimate the expected values and uncertainties in the values of the physical system that occur due to the random error. Moreover, the quantum mechanical model for physical systems is based upon probabilities and therefore state functions of all physical systems are modelled by quantum mechanics as functions of random variables.

A signal herein is defined as any measurable quantity that is related to the changing of the physical state of a process, system, or substance. A signal includes, but is not limited to, radiation produced by a natural or a man made process, electrical fluctuations produced by a natural or a man made process, distinctive materials or chemicals produced by a natural or a man made process, distinctive structures or configurations of materials produced by a natural or a man made process, or distinctive patterns of radiation or electrical activity produced by a natural or a man made process.

The measurement of a signal is provided by a measuring device. A measuring device as defined herein may be, but is not limited to, any physical device that interacts with a physical system and provides information that is ultimately represented in the form of either a mean and a covariance or a form that can be converted into a mean and a covariance. A measuring device as defined herein includes any device that emits a signal and measures the change of the signal upon its return, and a device that measures a signal that is naturally produced by a physical process, or any device that measures a signal that is produced by a man made process.

The EKF method has been predominant in all relevant applications involving calculation of expected values and uncertainties in the expected values for nonlinear functions of random variables, including determining the time evolution of state functions of physical systems, for over two decades. During that time there has been a continuing need for more accurately and easily estimating the expected values and covariance of nonlinear functions of random variables.

SUMMARY OF THE INVENTION

It is an object of this invention to provide a system and method which overcome the drawbacks mentioned hereinabove for estimation of values and uncertainties for nonlinear functions of one or more random variables.

It is another object of this invention to provide a signal processing and response system and method which overcome the drawbacks mentioned hereinabove for estimation of values for nonlinear functions involved in tracking of objects and control of physical systems, including the time evolution of a system in which noise is present.

It is another object of this invention to provide a signal processing system and method which enable a calculationally relatively simple method for estimating the expected value and covariance of a nonlinear function of one or more random variables.

It is another object of this invention to provide a signal processing system and a method for reliably estimating upper limits on the covariance of nonlinear functions of a random variable.

These and other objects of the invention may be accomplished by a signal processing system using a method of estimating the expected value and covariance of a nonlinear function of a random variable of a system when a predetermined covariance for the random variable is available, comprising:

(1) means for measuring a value of the random variable;
(2) means for generating a discrete distribution of a first set of values which has the measured value of the random variable as its mean and has the predetermined covariance;
(3) means for determining a second set of values by applying the nonlinear function to the first set of values;
(4) means for calculating an estimated expected value and an estimated covariance based upon the second set of values; and
(5) means for transmitting signals representing the estimated expected value and the estimated covariance to a response system.

These and other objects of the invention may also be accomplished by a computer readable memory storing instructions for configuring or configuring a signal processing system to perform a method of determining the expected value and covariance of a nonlinear function of a random variable of a system when predetermined covariance information for the random variable of that system is available, by configuring the signal processing system to include:

(1) means for measuring a value of the random variable;
(2) means for generating a discrete distribution of a first set of values which has the measured value of the random variable as its mean and has the predetermined covariance;
(3) means for determining a second set of values by applying the nonlinear function to the first set of values;
(4) means for calculating an estimated expected value and estimated covariance of the second set of values; and
(5) means for transmitting signals representing the estimated expected value and the estimated covariance to a response system.

The expected value of the second set of values is an accurate estimate of the expected value of the nonlinear function of the measured value of the random variable. The covariance of the second set of values is an accurate estimate of the probable error or covariance associated with the expected value of the nonlinear function of the measured value of the random variable.

The mean and predetermined covariance of the random variable may be captured by initially making a series of measurements of the random variable and then calculating initial values for the mean and covariance of the random variable.

The initial (and, hence, predetermined) covariance can then be used to define a discrete set of points about a subsequently measured value of the random variable that is centered (i.e., has an expected value) at the measured value and that has the predetermined covariance that was initially calculated for the random variable.

Preferably, the discrete set of points about the measured value of the random variable are symmetric about the measured value.

Preferably, the number of values in the discrete set is less than ten times the dimension of the vector space of the random variable.

Preferably, the expected value and the covariance are used to define a discrete set of values whose distribution is centered at the measured value.

These and other objects of the invention may also be accomplished by a specialized or programmed signal processing system for approximating a mean and a covariance of a function Y of a random variable X having a dimensionality n, based upon a measured value $\bar{X}$ for the random variable X, comprising:

a. means for measuring the random variable X a plurality of times to determine a plurality of measured values $\bar{X}_k$;

b. means for calculating an n x n covariance matrix F from said plurality of measured values $\bar{X}_k$;

c. means for calculating a scaled covariance matrix $$F' = \alpha F$$

wherein $\alpha$ is a positive real number;

d. means for calculating a matrix square root $$\sqrt{F'} \text{ FOR } F'$$

e. means for measuring X to obtain the measured value $\bar{X}$;

f. means for calculating a set $\chi_k$ for k=1 to 2n+1 as follows:

1. for k=0 $\chi_0 = \bar{X}$;
2. for k=1 to n $\chi_k = \chi_0 - (\sqrt{F'})_k$
   where $(\sqrt{F'})_k$ indicates the vector formed from the matrix component of $(\sqrt{F'})_k$ along the kth row, and
3. for k=n+1 to 2n $\chi_k = \chi_0 + (\sqrt{F'})_{k-n}$ g. means for calculating the values of the function $Y_k = Y(\chi_k)$ for k=0 to 2n;

h. means for calculating the weighted average $$Y_{av} = \frac{1}{2\alpha} \left[ \sum_{i=1}^{2n} Y(\chi_i) \right] + \frac{\kappa}{\alpha} Y(\chi_o)$$

wherein $\kappa$ is a real number;

i. means for calculating the weighted outer product WOP $(Y_i((i=0 \text{ to } 2n)))$ as:

$$WOP = \frac{\kappa}{\alpha} \{(Y(\chi_0) - Y_{av})(Y(\chi_0) - Y_{av})^T\} + \frac{1}{2\alpha} \sum_{i=1}^{2n} \{(Y(\chi_i) - Y_{av})(Y(\chi_i) - Y_{av})^T\}$$

where the superscript T indicates the transpose;

j. means for approximating estimated covariance of Y ($\bar{X}$) based upon WOP; and k. means for transmitting signals representing the estimated expected value and the estimated covariance of Y($\bar{X}$) based upon $Y_{av}$ and WOP to a response system for responding to the physical system.

Preferably, the means for approximating the estimated covariance of Y($\bar{X}$) comprises means for changing the matrix values of WOP by:

1. maintaining all eigenvectors of WOP remain unchanged
2. maintaining all positive eigenvalues of WOP remain unchanged; and
3. defining WOP' by replacing each negative eigenvalue of WOP by a non-negative real number.

Preferably, each negative eigenvalue of WOP or WOP' is replaced by either zero or its absolute value.

Preferably, the means for approximating comprises means for determining the eigenvectors and corresponding eigenvalues for WOP or WOP'.

Preferably, the method in which $\chi_k$ are determined ensures that the $\chi_k$ are symmetrical about $\bar{x}$.

Preferably, $\kappa$ is between $-n$ and $n$ (where n is the dimensionality of X).

Preferably, $\alpha$ is between 0 and 2n.

In a preferred embodiment, $\alpha$ is equal to the dimensionality of X (i.e., the number of components of the vector $\bar{x}$) and $\kappa$ is equal to three minus $\alpha$.

If the nonlinear function is a state function of a system and the time evolution of the state function is desired, then the values for the state variables of the state function are measured at a first time, discrete distributions about those variables are determined based upon predetermined knowledge of the amount of uncertainty in each of the state variables and the measured values for the state variables. The time transformation function is applied to the values of the discrete distributions to obtain values for the state variables at the second time. Then, mean and covariance values for the values for the state variables at the second time are calculated to determine the expected values and covariance values for the state variables at the second time. The expected values and covariance values calculated at the second time provide an accurate projection through time of the mean and covariance of the state variables.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
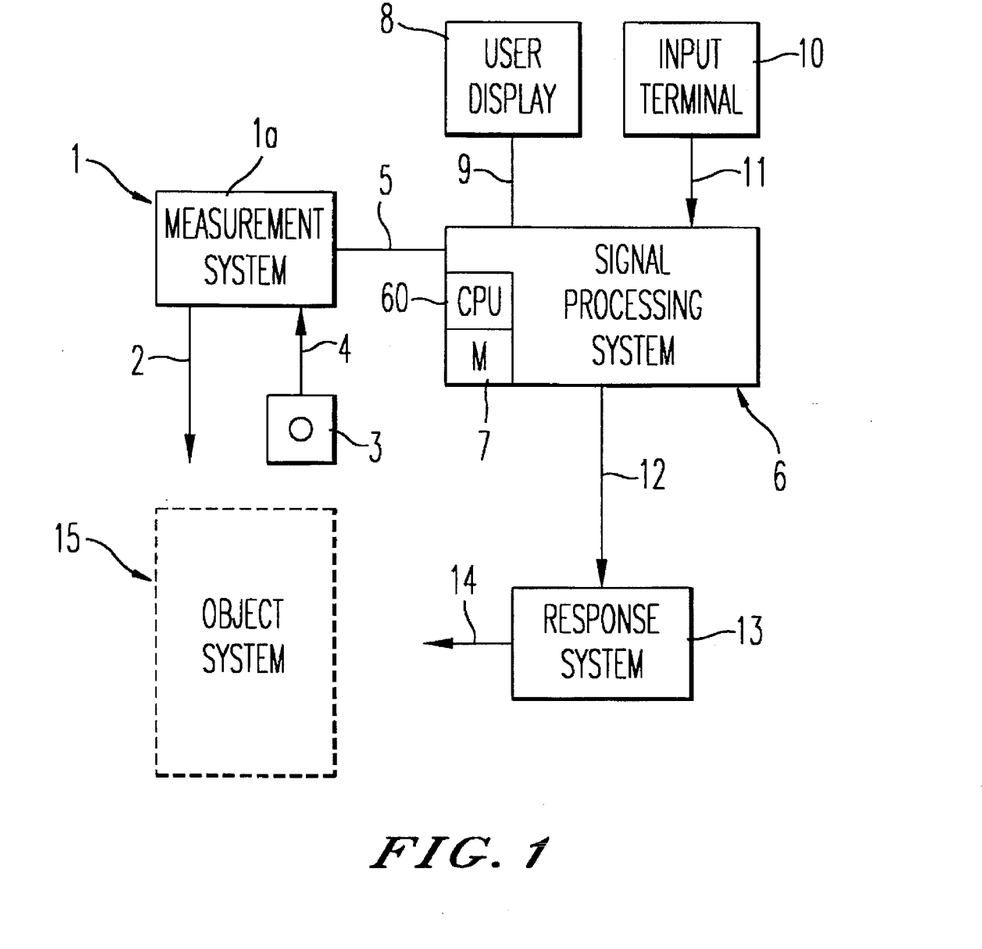
FIG. 1 is a block diagram of a signal processing system programmed or hardwired to perform a signal processing method according to the present invention.

Various other objects, features and attendant advantages of the present invention will be more fully appreciated as the same becomes better understood from the following detailed description when considered in connection with the accompanying drawings in which like reference characters designate like or corresponding parts, wherein:

FIG. 1 shows a block diagram of an engineering system according to the invention which includes a measurement system 1 for measuring properties of the object system 15. The measurement system 1 includes a probe signal source 2 of probe signals for probing the state of the object system 15, a detector 3 for detecting a signal from the object system 15 which containing information on the state of the object system 15 and a connecting wire 4 that connects the detector 3 to the measurement system 1 for transmitting an electrical signal corresponding to the signal detected by the detector 3 to the measurement system electronics 1A.

The electrical connection 5 connects the measurement system 1 to the signal processing system 6 for transmitting a signal (digital or otherwise) corresponding to the signal received by the detector 3 to the signal processing system 6 via the electrical connection 5. The signal processing system 6 includes the central processing unit or CPU 6A for performing operations on the signal transmitted to it from the measurement system to process that signal. The signal processing system 6 also includes the machine readable memory 7 for storing inter alia the signals received from the measurement system 1, intermediate and final results of processing by the CPU 6A, and instructions for controlling the CPU 6A. The machine readable memory may include ROM and RAM. A set of instructions for performing a method of estimating the value and uncertainties associated with that value, of a function of a random variable, according to the invention may be stored in either ROM or RAM.

The electrical connection 9 connects the signal processing system 6 to a user display 8 for transmitting display data to the user display 8. The user display 8 may be used to display the signals received by the signal processing system 6 from the measurement system 1 and the results of processing of those signals by the signal processing system 6.

The electrical connection 11 connects the input terminal 10 to the signal processing system 6, for transmitting input data from the input terminal 10 to the signal processing system 6 for controlling what processing the signal processing system 6 performs. The input terminal 10 may be a keyboard or mouse and may be used to control and/or reprogram the signal processing system 6 to perform a desired function. The electrical connection 12 connects the signal processing system 6 to the response system 13 for transmitting response signals to the response system 13. The response system 13 responds to the results of the signal processing performed on the signal received from the measurement system by the signal processing system. The response system 13 performs a function which is affected by the state of the object system 15, as that state is determined by the signal processing system 6.

When the system envisioned in FIG. 1 corresponds to a radar tracking system, the measurement system 1 is the antenna system and associated front and filters and preamplifiers and the response system 13 may be the control system for positioning the radar antennas to provide tracking of the object system 15. In this case the response signal 14 is the signal controlling movement of the radar beam to follow the object system 15.

Alternatively, the response system 13 could be the control system for a missile system or other weapons system for attacking the object system 15. In this case the response 14 is the response of the missile system, missile, or other weapons.

In the missile defense system of the invention, the signal processing system 6 of FIG. 1 receives a mean and covariance signal from the measurement system 1 that relate to the range (i.e., distance from the radar antenna to the missile) and bearing (i.e., angle in which the radar antenna is pointing) of a missile. The signal processing system 6 applies a known nonlinear transformation for converting the range and bearing to cartesian coordinates and transmits the mean and covariance of the cartesian coordinates to a weapon system which, in this case, would correspond to the response system 13. The response system 13 responds in a way that is a function of both the mean and covariance of the cartesian coordinate signals by generating a response 14 of orienting a sensor to point towards the missile, producing an illuminated signal on a display device, or determining when to fire an antimissile weapon, etc.

In another embodiment, the system envisioned in FIG. 1 corresponds to an industrial plant, such as a nuclear power plant, an oil refinery, or a steel manufacturing plant. In this case the measurement system would receive data from a plurality of detectors similar to the detector 3. The plurality of detectors monitor various different physical quantities, such as temperature, pressure, chemical composition, acidity, salinity, etc. The measured values from each of the plurality of detectors would correspond to measurements of random variables as discussed hereinabove. The signal processing system 6 would calculate values for the state of the object system (i.e., the power plant, oil refiner, or steel manufacturing plant, for example) based upon a model of the object system which was a function of the random variables that the detectors measured. The signal processing system 6 would incorporate the uncertainties associated with the measurements on the object system 6, in the manner discussed herein of the method of the invention.

In the industrial plant embodiments, the state of the object system 15 or instructions related to the state of the object system 15 would be transmitted to the response system 13 via the electrical connection 12. The response system 13 would provide the process control 14 (i.e., for controlling the nuclear power plant, oil refinery, or steel manufacturing plant, for example).

In the industrial plant embodiments, the state of the system is modeled according to a function of several measured variables. Each variable has a different uncertainty associated with it. Therefore, the measurements of each variable are weighted according to their reliability in order to estimate the state function for this type of system.

In one industrial plant embodiment the rate of change of temperature and pressure of a chemical process is measured by multiple sensors of the measurement system 1 and combined to form a mean and a covariance from those measurements. The signal processing system 6 then uses known nonlinear equations related to the evolution of the chemical process to produce a mean and a covariance signal corresponding to a state of the chemical process at a subsequent time. The signal is transmitted to the response system 13 for controlling the process. The response system 13 may, for example, generate a control reaction 14 for controlling the temperature and/or pressure in the chemical process. In the event that the response system indicates a dangerous condition, it controls an alarm to indicate the dangerous condition, allowing personnel to evacuate the area adjacent the chemical process.

Another embodiment of the invention relates to vehicle position determination. Fast moving autonomous vehicles may use the global positioning system (GPS) to estimate their absolute position. The information provided to the vehicle by the GPS may be augmented by information from an on-board odometric sensor providing estimates of speed and acceleration. In order to make joint use of the information from the odometric sensor and the GPS, the two types of information must be combined in order to more accurately estimate the vehicles position. One type of specific use for this type of information would be for an autonomous vehicle which would use a digital terrain map to plot a course if it had accurate enough position information.

Referring now back to FIG. 1, the odometric sensor information and the GPS information would correspond to information received by two separate detectors 3 (only one detector 3 is shown in FIG. 1). Either the GPS information or the odometric sensor information, including the uncertainties involved therewith, would have to be transformed to the coordinate space of the other type of information, so that both types of information and their uncertainties were represented in the same coordinate space, thereby allowing combination of those two types of information for a more accurate determination of the position and uncertainty in position of the vehicle by the signal processing system 6. The transformation function for transforming, for example, the GPS information from global coordinates to, for example, cartesian coordinates in which the odometric information was represented, would be provided by the method of the present invention for estimating transformation values and uncertainties in those values.

The position of the vehicle (whose motive drive corresponds to the response 14), and the uncertainties associated therewith determined by the signal processing system 6 from the combination of data from the odometric sensor and the GPS sensor, would be used by the signal processing system to generate control signals for controlling the motion of the autonomous vehicle. In this embodiment, the object system 15 would correspond to the terrain surrounding the autonomous vehicle.

Alternatively, the autonomous vehicle may include only on board sensors (i.e., no GPS sensors) corresponding to the detector 3 of FIG. 1. In this alternative, the signal processing system 6 uses known nonlinear equations relating to the motion of the vehicle to produce a mean and covariance estimate of the position of the vehicle at a subsequent time. This signal is then used to control the autonomous vehicle to control its orientation and speed using a control mechanism corresponding to the response system 13 for controlling the steering column and acceleration of the vehicle.

In another embodiment, the system of the present invention is a Doppler radar which provides signals corresponding to mean and covariance of position, velocity, and angular speed. In one example, a Doppler radar is used to measure the position, velocity, and angular speed of the eye of a hurricane. In this example, the Doppler radar antenna system corresponds to the measurement system 1 of FIG. 1 and the signal processing system 6 uses known nonlinear equations relating to the motion of hurricanes to produce a signal corresponding to mean and covariance of the estimated position of the hurricane at some subsequent time. The mean and the covariance of the estimated position of the hurricane at the subsequent time may be transmitted by, for example, the response system 14, to a satellite camera which uses the transmitted information to track the hurricane. The estimated position and covariance can also be transmitted, for example, to a weather observation aircraft or to radio and TV weather broadcast stations.

In another embodiment, the measure system 1 functions to determine the range and bearing between it and a highly visible landmark and the signal processing system 6 converts that range and bearing information to cartesian coordinates having a mean and a covariance. The cartesian coordinate mean and covariance are stored in a machine readable memory so that they are available for future use. At some subsequent time, a vehicle reading the cartesian coordinate mean and covariance information from the memory, determines its position relative to the landmark in part by retrieving the stored information from its memory for use in physically controlling its motion.

In yet another embodiment, the measurement system 1 receives GPS signals transmitted from satellites comprising the GPS. The received signals provide mean and covariance information about the measurement system 1 relative to the satellites broadcasting the GPS signals. The signal processing system 6 then performs a known nonlinear function for transforming the GPS signals to more useful coordinates, such as cartesian coordinates, and transmits a signal corresponding to the mean and covariance of the position of the measurement system 1. In cartesian coordinates. The mean and covariance of the measurement system 1 in cartesian coordinates is received by the response system 13 which then determines how to respond based upon that information. The response system 13 may, for instance, a control a system for a drill, the control for motive propulsion of a ship or a plane, etc.

In a related invention, the measurement system 1 receives, instead of a signal representing a physical system, financial data related to the value of a financial quantity, such as a standard unit of a precious metal, an exchange rate, the value of a security, or to other financial data. The signal processing system 6 then uses a known nonlinear equation estimating the time evolution of that financial quantity to generate a mean and a covariance signal corresponding to values for financial quantity that are predicted for subsequent times. The predicting mean and covariance signals are then transmitted to receiver devices which display the predictions which can then be used by people in industrial institutions for controlling purchase and sale of financial quantities, mining activities related to those financial quantities, transportation of goods related to those financial quantities, etc.

Figure 2:
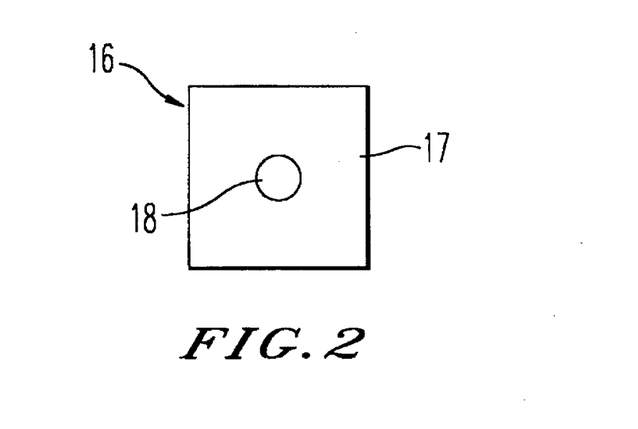
FIG. 2 pictorially shows a computer programmable product upon which is encoded instructions for configuring a generalized signal processing system to provide means for performing the specialized signal processing method according to the present invention.

FIG. 2 shows a particular type of computer readable memory media, namely, the magnetic disk 16. The magnetic disk 16 consists of a cover 17 housing an annular magnetic disk having a central hole 18. The magnetic disk 16 of the present invention has a magnetic media upon which a computer program for controlling a generalized signal processing system for performing a method of the invention for estimating transformation values and uncertainties in those values of a function modelling a system of a random variable has been recorded.

Figure 3A:
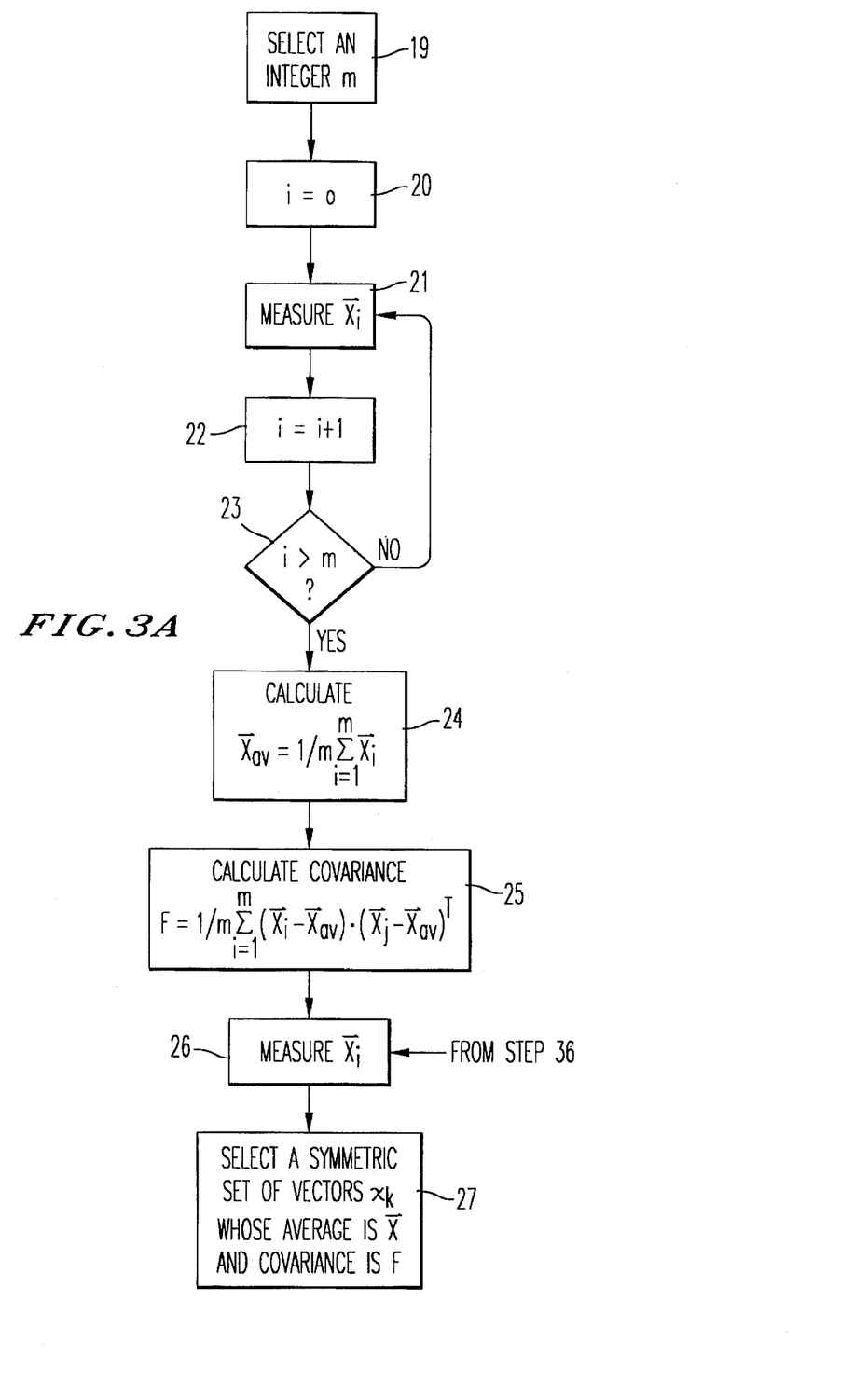
FIGS. 3A–3C are a flow chart showing the logical steps that a signal processing system performs when performing the signal processing method according to the present invention.
Figure 3B:
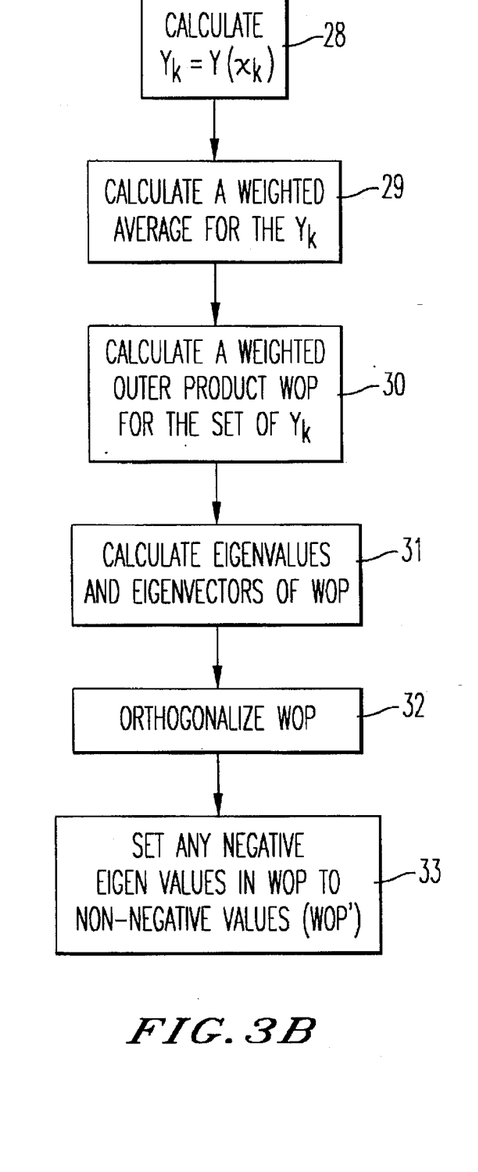
Figure 3C:
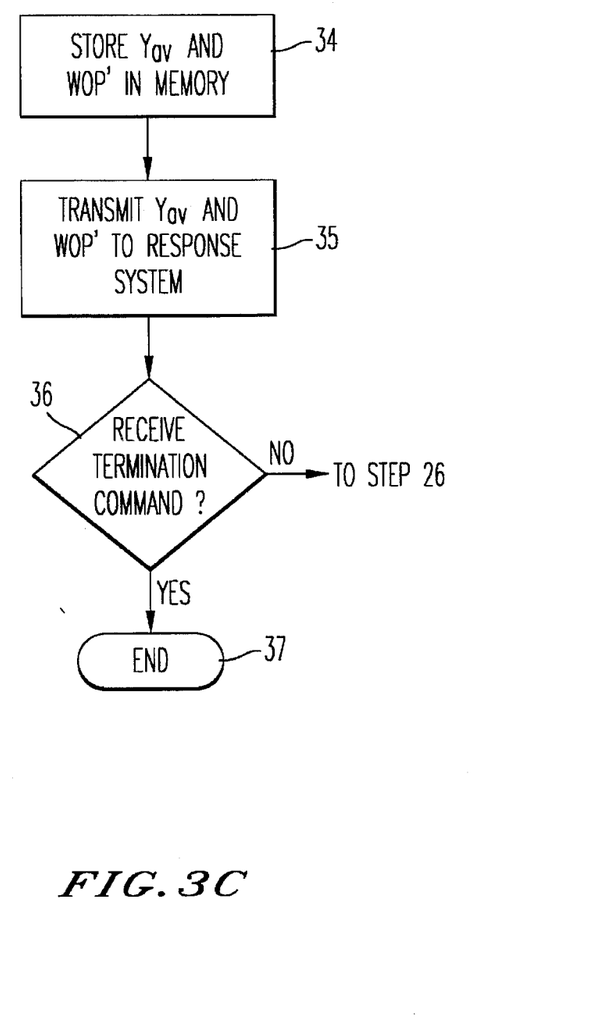

FIGS. 3A–3C are a flow chart showing the logical steps for performing a method according to the present invention.

In FIG. 3A, an integer m is selected in that step 19 and an incremental counter value for i is set to 0 at step 20. A loop for measuring m values of the random variable X is provided in steps 21–23. At step 21 a first value for the random variable X is measured. Following the standard convention, that capital X refers to the random variable whereas the lower case $\bar{x}_i$ refers to an ith measured value for X. The counter is incremented in step 22. Whether m measurements have been made is determined in step 23.

Once m measurements of the random variable X have been made, the average of the measured values $\bar{x}_{av}$ and the covariance matrix F for those measured values are determined in steps 24 and 25, respectively.

Steps 19–25 provide predetermined information necessary for estimating the expected value and covariance associated with a function Y of the random variable X. Since that information may be predetermined, it is not necessary to obtain it each time one wishes to determine the expected value and uncertainties associated therewith of a function of a measured value for X. However, the expected value and covariance obviously could be updated with each new measurement of X. The average and covariance of the set of m measured values for the random variable X may be stored in a computer readable memory, such as the memory 7 of the signal processing system 6 shown in FIG. 1. The average and covariance of the set of m measured values for the random variable may be retrieved from the computer readable memory during calculation of the expected value and covariance of the function Y of a measurement $\bar{x}$ of the random variable X.

Calculation of the expected value and covariance of the function Y of a measurement $\bar{x}$ begins at step 26, where a value $\bar{x}$ is measured. A set of vectors $\chi_k$ which have $\bar{x}$ as their average have the covariance matrix F as their covariance, are determined at step 27. Preferably, the set of vectors $\chi_k$ are symmetrically distributed about $\bar{x}$. The $k$ subscript on $\chi_k$ indicates the number of vectors in the set. Preferably, k=2n+1 where n is the dimension of the vector space for the (vector) random variable X. The preferred set of vectors $\chi_k$ can be determined by first calculating the matrix square root: $\sqrt{F'}$ for a scaled version of the covariance matrix F, and then choosing the columns of this matrix square root as the set of vectors $\chi_k$. Preferably, the scaled version F'=nF where n is the dimensionality of X.

The values of the function Y for each of the 2n+1 values for $\chi_k$ are calculated at step 28. A weighted average $Y_{av}$ for the 2n+1 values of $Y_k$ are calculated at step 29. Preferably, the weighted average weights all of the $Y_k$'s equally, except for the $Y_k$ which is a function of the value of $\chi$ that is equal to the measured value for X. The equation for the preferred weighted average $Y_{av}$ is as follows:

$$Y_{av} = \frac{1}{2\alpha} \left[ \sum_{i=1}^{2n} Y(\chi_i) \right] + \frac{\kappa}{\alpha} Y(\chi_0)$$

The weighted average corresponds to the expected value of the function Y(X) for the measured value $\bar{x}$.

The estimated covariance matrix associated with Y(X) for the measured value $\bar{x}$ is calculated in steps 30 through 33.

First, the weighted outer product is calculated at step 30. The weighted outer product is defined as:

$$WOP = \frac{\kappa}{\alpha} \{(Y(\chi_0) - Y_{av})(Y(\chi_0) - Y_{av})^T\} + \frac{1}{2\alpha} \sum_{i=1}^{2n} \{(Y(\chi_i) - Y_{av})(Y(\chi_i) - Y_{av})^T\}$$

where the superscript T indicates the transpose:

Second, the eigenvalues and eigenvectors for WOP are calculated and WOP is orthogonalized at steps 31 and 32. However, it is not necessary to orthogonalize WOP in order to determine the eigenvalues and eigenvectors.

Finally, any negative eigenvalue for WOP is set to a non-negative value, preferably to either its absolute value or zero, in step 33, thereby defining a new matrix WOP'. The values for $Y_{av}$ and WOP' are the expected value and covariance matrix for the function Y(X) for the value $\bar{X}$. Those values are stored in memory in step 34 in, for example, the memory 7 shown in the signal processing system 6 in FIG. 1. At some time, the expected value and covariance matrix for the function Y are transmitted to the response system, such as the response system 13 shown in FIG. 1.

Whether a termination command has been received is determined at step 36. A termination command may be received, for example, by the signal processing system 6 from the input terminal 10 of FIG. 1. If no termination command is received, then step 26 is re-executed and another measurement of the random variable X is made for further feedback to the response system at step 35. If a termination command has been received at step 36 then the process terminates.

Figure 4A:
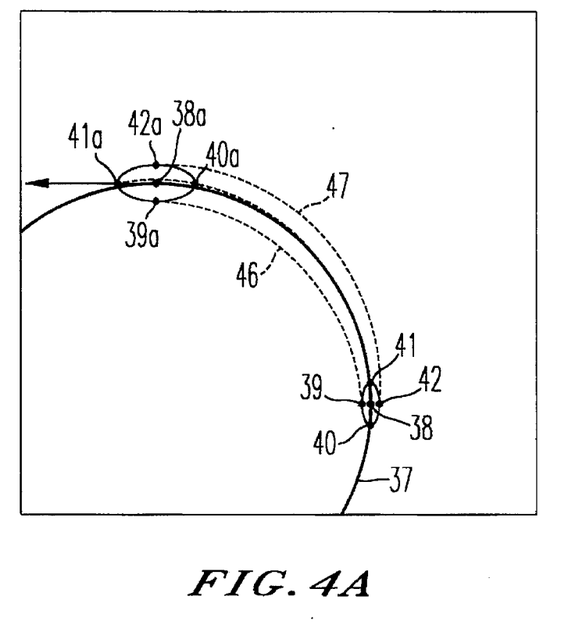
FIG. 4A is a graph pictorially illustrating the particular example of the predicted time evolution in position and estimated covariance in that position obtained using the signal processing method of the present invention for measurements of an object moving along a circular path.

FIG. 4A shows the results of applying the preferred method of the present invention to a physical system in which the parametric equations of motion for an object define circular motion, but include a random variable noise term. The solid circular line 37 indicates the trajectory of the object in the absence of the random variable noise term.

The measured position for the particle at a first time is indicated by the point 38. Points 38, 39, 40, 41, and 42 indicate the set of first points about the measured position 38 which are chosen using the method of the invention. The dashed circular lines 46 and 47 schematically illustrate the propagation of the set of first points through time from the first time to a second time. The circle connecting the points 39, 40, 41, and 42 is merely a schematic illustration of the magnitude of the uncertainty in the position of the object.

The points 38a, 39a, 40a, 41a, and 42a are the locations of the points determined by applying the time transformation function that transforms the location of the object from the first time to the second time. The points 38a, 39a, 40a, 41a, and 42a are in a locus around the line 37, accurately tracking the trajectory of the model of the trajectory of the object when no noise is present. In the method of the present invention, the expected position and covariance matrix of the object at the second time would be calculated based upon the points 38a, 39a, 40a, 41a, and 42a.

Figure 4B:
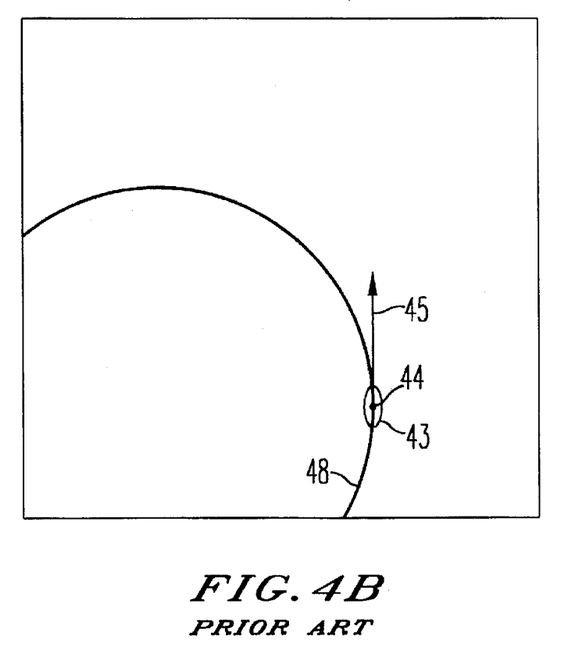
FIG. 4B is a graph pictorially illustrating the particular example of the time evolution in position and estimated covariance in that position obtained using the prior art EKF signal processing method for measurements of an object moving along a circular path.

FIG. 4B shows the results of applying the EKF method to the same physical system as in FIG. 4B in which the parametric equations of motion for an object define circular motion, but include a random variable noise term. The solid circular line 48 indicates the trajectory of the object in the absence of the random variable noise term.

The measured position of the particle is indicated by the point 44. Ellipse 43 about the point 44 is merely a schematic illustration of the magnitude of the uncertainty associated with the noise. The vector direction 45 indicates the direction of motion predicted by the EKF for this system. Obviously, the vector direction of motion of the object calculated by the EKF method deviates from the trajectory of the particle in the absence of the noise.

Preferably, the signal processing system 6 is a digital processing system in which case the signals received from by the detector 3 must be converted into a digital signal at some point. When the signal processing system 6 is a digital processing system, either the detector 3, the measurement system 1, or the signal processing system 6 includes an analog to digital converter for converting an analog signal corresponding to the signal received by the detector 3 into a digital signal. The response system 13 may be structured to act upon either an analog signal or a digital signal. If the response system 13 is structure to act upon an analog signal, either the signal processing system 6 or the response system 14 includes a digital to analog converter for converting a signal generated by the signal processing system 6 for reception by the response system 6 into an analog signal.

The electrical lines between the blocks shown in the system of FIG. 1 can each be replaced by equivalent wireless transmission and reception elements.

Athans et al., "Suboptimal State Estimation for a Continuous-Time Nonlinear Systems From Discrete Noisy Measurements," IEEE Transactions on Automatic Control, TAC-13(6), pp. 504–518, October 1968; Bar-Shalom and Fortmann, "Tracking and Data Association" Academic Press, 1988; Jazwinski, "Stochastic Processes and Filtering Theories," Academic Press, 1970; Julier, "Process Models for the High-Speed Navigation of Conventional Road Vehicles," Technical Report, University of Oxford, 1994; Julier and Durrant-Whyte, "Navigation and Parameter Estimation of High Speed Road Vehicles," 1995 Robotics and Automation Conference, Nagoya, Japan; Julier and Ulmann, "A General Method for Approximating the Nonlinear Transformations of Probability Distributions," WWW htt p. //phoebe. robots.ox.ac. uk/default.htm, August 1994; Julier et al., "A New Approach for Filtering Nonlinear Systems," submitted to the 1995 American Control Conference, Seattle,Washington; Maybeck, "Stochastic Models, Estimation, and Control," Vol. 1, Academic Press, 1979; Maybeck, "Stochastic Models, Estimation, and Control," Vol. 2, Academic Press, 1982; Papoulis, "Probability, Random Variables, and Stochastic Processes," McGraw Hill, Inc. 1965; Quine, "Fault Detection in Spacecraft Guidance Systems," Technical Report, University of Oxford, 1994; Quine et al., "Implicit Jacobians for Linearized State Estimation in Nonlinear Systems," submitted to the 1995 American Automatic Control Conference, Seattle, Washington, 1994; Strang, "Linear Algebra and its Applications," Harcourt Brace Jovanich, 3rd Ed., 1988; Ulmann, "Algorithms for Multiple Target Tracking," American Science, 80(2), pp. 128–141, 1992; Ulmann, "Simultaneous Map Building and Localization for Real Time Application," Technical Report, University of Oxford, 1994; Gordon et al., "Novel Approach to Nonlinear/Non-Gaussian Bayesian State Estimation," IEEE Proceedings—F, vol. 140, no. 2, April 1993; and United Kingdom Patent Application No. 9417170.9 filed Aug. 25, 1994, are all incorporated herein by reference. It should be noted that some of the foregoing documents are prior art, some of the documents are not prior art, and some of the documents further describe the invention disclosed herein.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A specialized or programmed signal processing system for approximating a mean and a covariance of a function Y of a random variable X of a physical system having a dimensionality n, based upon a measured signal $\bar{X}$ for the random variable X, comprising:

a. means for measuring the random variable X a plurality of times to determine a plurality of measured signals $\bar{X}_k$;

b. means for calculating an n x n covariance matrix F from said plurality of measured signals $\bar{X}_k$;

c. means for measuring X to determine the measured signal $\bar{X}$;

d. means for calculating a scaled covariance matrix $$F' = \alpha F$$

wherein $\alpha$ is a positive real number;

e. means for calculating a matrix square root $\sqrt{F'}$ for F' f. means for calculating $\chi_k$ for k=1 to 2n+1 as follows:
   1. for k=0 $\chi_0 = \bar{X}$
   2. for k=1 to n $\chi_k = \chi_0 - (\sqrt{F'})_k$
      where $(\sqrt{F'})_k$ indicates the vector formed from the matrix component of $\sqrt{F'}$ along the kth row, and
   3. for k=n+1 to 2n $\chi_k = \chi_0 + (\sqrt{F'})_{k-n}$ g. means for calculating the values of the function $Y_k = Y(\chi_k)$ for k=0 to 2n;

h. means for calculating the weighted average $$Y_{av} = \frac{1}{2\alpha}\left[\sum_{i=1}^{2n} Y(\chi_i)\right] + \frac{\kappa}{\alpha} Y(\chi_0)$$

wherein $\kappa$ is a real number;

i. means for calculating the weighted outer product WOP $(Y(\chi_i, i=0 \text{ to } 2n))$ as:

$$WOP = \frac{\kappa}{\alpha}\{(Y(\chi_0) - Y_{av})(Y(\chi_0) - Y_{av})^T\} +$$

$$\frac{1}{2\alpha}\sum_{i=1}^{2n}\{(Y(\chi_i) - Y_{av})(Y(\chi_i) - Y_{av})^T\}$$

where the superscript T indicates the transpose;

means for approximating covariance of $Y(\bar{X})$ based upon WOP; and means for transmitting signals representing the weighted average and the approximated covariance of $Y(\bar{X})$ to a response system for responding to the physical system.

2. A system according to claim 1, wherein said means for approximating comprises means for changing the matrix values of WOP by:

1. maintaining all eigenvectors of WOP remain unchanged
   2. maintaining all positive eigenvalues of WOP remain unchanged; and
   3. replacing each negative eigenvalue of WOP by a non-negative real number.

3. A system according to claim 2, wherein the means for changing replaces each negative eigenvalue of WOP by zero.

4. A system according to claim 2, wherein the means for changing replaces each negative eigenvalue of WOP by its absolute value.

5. A system according to claim 2, wherein the means for changing further comprises means for determining the eigenvectors and corresponding eigenvalues for WOP.

6. A system according to claim 1, wherein said $\chi_k$ have the covariance F and mean $\chi$.

7. A system according to claim 1 wherein $\kappa$ is between $-n$ and n.

8. A system according to claim 1, wherein $\alpha$ is between 0 and 2n.

9. A system according to claim 1, wherein $\alpha$ equals the dimensionality n of X.

10. A system according to claim 9, wherein $\kappa$ equals 3 minus $\alpha$.

11. A signal processing system for estimating the expected value and covariance of a nonlinear function of a random variable of a physical system when a predetermined covariance for the random variable of the physical system is available, comprising:

(1) means for measuring a value of the random variable thereby providing a signal representing the measured value;

(2) means, coupled to the means for measuring, for generating a discrete distribution of a first set of values which has the measured value of the random variable as its mean and the predetermined covariance;

(3) means, coupled to the means for generating, for determining a second set of values by applying the nonlinear function to the first set of values;

(4) means, coupled to the means for determining, for calculating an estimated expected value and an estimated covariance based upon the second set of values;

(5) means, coupled to the means for calculating, for transmitting signals representing the estimated expected value and the estimated covariance; and (6) means, coupled to the means for transmitting, for responding to the physical system based upon the estimated expected value and estimated covariance.

12. A system according to claim 11, wherein the means for measuring a value of the random variable comprises means for measuring a variable which is a function of one of position an object of the physical system, temperature of an object of the physical system, pressure of a fluid of the physical system, chemical composition of a material of the physical system, and a voltage in the physical system.

13. A system according to claim 11, wherein said discrete distribution is symmetric about the measured value of the random variable.

14. A computer readable memory storing instructions for configuring or configuring a signal processing system to perform a method of estimating the expected value and covariance of a nonlinear function of a random variable when a predetermined covariance for the random variable is available, by configuring the signal processing system to provide:

(1) means for measuring a value of the random variable, thereby providing a signal representing the measured value;

(2) means for generating a discrete distribution of a first set of values which has the measured value of the random variable as its mean and has the predetermined covariance;

(3) means for determining a second set of values by applying the nonlinear function to the first set of values;

(4) means for calculating an estimated expected value and an estimated covariance based upon the second set of values;

(5) means for transmitting signals representing the estimated expected value and the estimated covariance; and (6) means for responding to the physical system based upon the estimated expected value and the estimated covariance.

15. A system according to claim 14, wherein the means for measuring a value of the random variable comprises means for measuring a variable which is a function of one of distance to an object of the physical system, temperature of an object of the physical system, pressure of a fluid of the physical system, chemical composition of a material of the physical system, and voltage of the physical system.

16. A system according to claim 14, wherein said discrete distribution is symmetric about the measured value of the random variable.

* * * * *